Patented June 2, 1925.

1,540,485

UNITED STATES PATENT OFFICE.

AUGUST LEOPOLD LASKA AND ARTHUR ZITSCHER, OF OFFENBACH-ON-THE-MAIN, GERMANY, ASSIGNORS TO CORPORATION OF CHEMISCHE FABRIK GRIESHEIM-ELEKTRON, OF FRANKFORT-ON-THE-MAIN, GERMANY.

TRISAZO DYE.

No Drawing.   Application filed April 14, 1923. Serial No. 632,130.

*To all whom it may concern:*

Be it known that we, AUGUST LEOPOLD LASKA and ARTHUR ZITSCHER, both citizens of Germany, and residents of Offenbach-on-the-Main, Germany, have invented a new and useful Improvement in Trisazo Dyes, of which the following is a specification.

Our invention relates to new azodyestuffs, insoluble in water of the general formula:

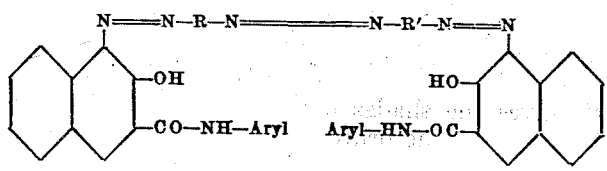

R and R' meaning different or the same aromatic radicles not containing a sulfo group, which are when dry reddish to bluish black powders of metallic lustre, soluble in sulfuric acid to a blue to bluish green solution, yielding upon reduction with stannous chlorid two molecular proportions of an arylid of 1-amino-2-hydroxy-3-naphthoic acid and two molecular proportions of different or the same arylendiamins.

They can be obtained by combining the tetrazocompound of a diaminoazobody not containing a sulfo group with an arylid of 2.3-hydroxynaphthoic acid.

The new dyestuffs can be used for the production of valuable pigment colors, they can be produced also on the fiber by treating the goods, which are impregnated with an arylid of 2.3-hydroxynaphthoic acid, with the tetrazocompound of a diaminoazobody.

In this manner black-violet to black tints of an excellent fastness to washing are obtained.

As diaminoazobodies besides diaminoazobenzene itself there are particularly suitable for the process, compounds containing at least an aminogroup in para-position to the azogroup, which therefore can be obtained e. g. by combining a nitroamino base or a monoacyldiaminobody with an amin, capable of combining in para-position, and by a subsequent reduction or saponification respectively. As suitable ingredients we may name; e. g. meta- and para-nitroanilin and their derivatives, such as chloronitroanilins, nitro toluidins, nitroanisidins, nitrothioanisidins, nitronaphthylamins, and the corresponding monoacyldiamins, as well as meta-toluidin, para-xylidin, para-cresidin, acetyl-meta-toluylendiamin, α-naphthylamin and such of its derivatives as are adapted to combine in 4-position, and others.

As azocomponents we may use all the arylids of 2.3-hydroxynaphthoic acid, such as e. g. the anilid, toluidids, anisidids and phenetidids α- and β-naphthalid, arylids chlorosubstituted in the arylidoresidue, 2.3-hydroxynaphthoyl-aminothiazol, and so on.

According to the components used dark violet to black shades are obtained.

The following examples illustrate the invention, the parts being by weight.

Example 1.

A tetrazosolution, prepared from 27 parts of para-aminobenzene-azo-para-cresidin is combined with a solution of 34 parts of para-phenetidid of 2.3-hydroxynaphthoic acid in dilute caustic soda solution, to which is added an excess of sodium acetate and turkey red oil. The separated dyestuff is filtered and washed. It is used for the production of lakes advantageously in the form of a paste. The color lakes, prepared therefrom in the usual manner, give dark bluish black shades.

Example 2.

Production of the dyestuffs on the fiber. The yarn, well boiled and dried, is impregnated with a solution of—

12 gr. of α-naphthalid of 2.3 hydroxy-naphthoic acid, 15 cc. of caustic soda solution of 34° Bé. and 20 cc. of turkey red oil per liter, well wrung out and developed without drying with a tetrazosolution having an addition of sodium acetate and containing 6 gr. of para-aminobenzene-azo-α-naphthylamin per liter.

In this manner bluish black shades of an excellent fastness are obtained.

By a subsequent treatment with copper salts the fastness to light of the colored fabrics can be increased.

With other diaminoazobodies and other arylides of 2.3-hydroxynaphthoic acid the process may be conducted similarly.

The following table gives the shades of a number of dyestuffs, prepared according to the present process:

| Tetrazocompound of the diaminoazobody from— | Combined with the arylid of 2.3-hydroxy-naphthoic acid | Shades |
|---|---|---|
| Para-nitroanilin+meta-toluidin, reduced. | Anilid | Black. |
| Do. | α-naphthalid | Black. |
| Para-nitroanilin + acetyl-met-atoluylendiamin, reduced. | do | Black. |
| 2-chloro-4-nitroanilin+acetyl-meta-toluylendiamin, reduced. | do | Black. |
| 2.5-dichloro-4-nitroanilin+acetyl-meta-toluylendiamin, reduced. | do | Violet-black. |
| Para-nitroanilin+para-cresidin, reduced. | Anilid | Violet-black. |
| Do. | α-naphthalid | Bluish black. |
| Do. (example 1). | Para-phenetidid | Bluish black. |
| 2-chloro-4-nitroanilin+para-cresidin, reduced. | Anilid | Violet-black. |
| 2.5-dichloro-4-nitroanilin+para-cresidin, reduced. | α-naphthalid | Violet-black. |
| 2.6-dichloro-4-nitroanilin+para-cresidin, reduced. | Anilid | Violet-black |
| 5-nitro-1.2-toluidin+para-cresidin, reduced. | do | Bluish black. |
| 5-nitro-1.2-anisidin+para-cresidin, reduced. | do | Bluish black. |
| Do. | α-naphthalid | Bluish black. |
| 4-nitro-2.1-aminothioanisol+para-cresidin, reduced. | do | Brownish black. |
| 2-nitro-1.4-phenylendiamin (1 mol.)+para-cresidin (1 mol.). | do | Black. |
| 2-nitro-1.4-phenylendiamin (1 mol.)+para-cresidin (1 mol.). | Para-anisidid | Bluish black. |
| Para-nitroanilin+4-chloro-1.2-anisidin, reduced. | α-naphthalid | Violet-black. |
| 2.6-dichloro-4-nitroanilin+4-chloro-1.2-anisidin, reduced. | do | Violet-black. |
| Para-nitroanilin+α-naphthylamin, reduced (example 2). | do | Bluish black. |
| Para-nitroanilin+tetrahydro-α-naphthylamin, reduced. | do | Black. |
| Do. | Anilid | Violet-black. |

Now what we claim and desire to secure by Letters Patent is the following:

1. As new products the azodyestuffs, insoluble in water, of the general formula:

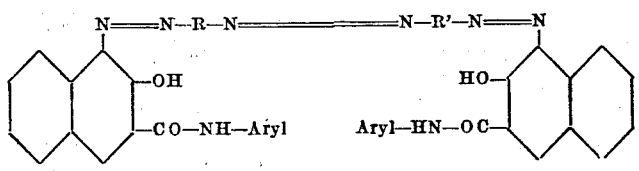

R and R' meaning different or the same aromatic radicles not containing a sulfo group, which are, when dry, reddish to bluish black powders of metallic lustre, soluble in sulfuric acid to a blue to bluish green solution, yielding upon reduction with stannous chlorid two molecular proportions of anarylid of 1-amino-2-hydroxy-3-naphthoic acid and two molecular proportions of different or the same arylendiamins, which dyestuffs can be used for the production of valuable pigment colors and give, when produced on the fiber, black-violet to black shades of an excellent fastness to washing.

2. Materials dyed with the new azodyestuffs according to claim 1, said dyestuffs being developed on the fiber of the material.

3. As new products the azodyestuffs, insoluble in water, of the formula:

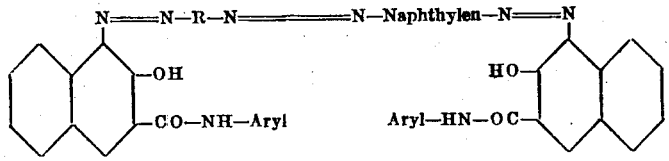

R meaning an aromatic radicle of the benzene or naphthalene series not containing a sulfo group, which are when dry reddish to bluish black powders of metallic lustre, soluble in sulfuric acid to a blue to bluish green solution, yielding upon reduction with stannous chlorid two molecular proportions of arylid of 1-amino-2-hydroxy-3-napthoic acid, one molecular proportion of an arylendiamin and one molecular proportion of a naphthylendiamin, which dyestuffs can be used for the production of valuable pigment colors and give, when produced on the fiber, black-violet to black shades of an excellent fastness to washing.

4. Materials dyed with the new azodyestuffs according to claim 3, said dyestuffs being developed on the fiber of the material.

5. As new products the azodyestuffs, insoluble in water, of the formula:

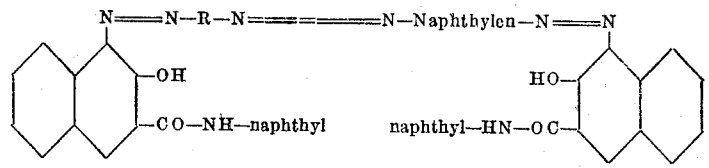

R meaning an aromatic radicle of the benzene or naphthalene series not containing a sulfo group, which are when dry reddish to bluish black powders of metallic lustre, soluble in sulfuric acid to a blue to bluish green solution, yielding upon reduction with stannous chlorid two molecular proportions of napthalid of 1-amino-2-hydroxy-3-naphthoic acid, one molecular proportion of an arylendiamin and one molecular proportion of a naphthylendiamin, which dyestuffs can be used for the production of valuable pigment colors and give, when produced on the fiber, black-violet to black shades of an excellent fastness to washing.

6. Materials dyed with the new azodyestuffs according to claim 5, said dyestuffs being developed on the fiber of the material.

7. As new products the azodyestuffs, insoluble in water, of the formula:

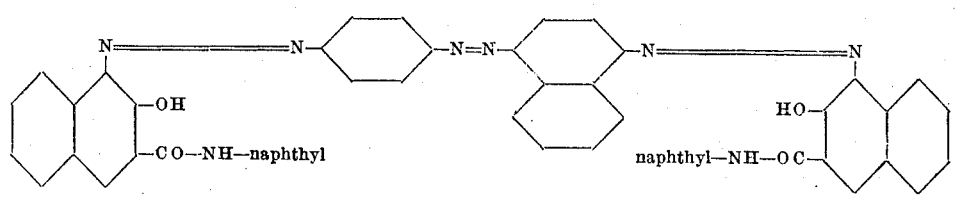

which are when dry bluish black powders of metallic lustre, soluble in sulfuric acid to a bluish green solution, yielding upon reduction with stannous chlorid two molecular proportions of naphthalid of 1-amino-2-hydroxy-3-naphthoic acid and one molecular proportion of para-phenylendiamin and one molecular proportion of 1.4-naphthylendiamin, which dyestuffs can be used for the production of valuable pigment colors and give when produced on the fiber, bluish black shades of an excellent fastness to washing.

8. Materials dyed with the new azodyestuffs according to claim 7, said dyestuffs being developed on the fiber of the material.

In testimony, that we claim the foregoing as our invention, we have signed our names, this 28th day of March 1923.

AUGUST LEOPOLD LASKA.
ARTHUR ZITSCHER.

Witnesses:
GABRIELE FLESCH,
C. C. L. B. WYLES.